United States Patent
Grooters et al.

(10) Patent No.: US 9,955,114 B1
(45) Date of Patent: Apr. 24, 2018

(54) OFFICE SYSTEM TELEPRESENCE ARRANGEMENT

(71) Applicant: Steelcase Inc., Grand Rapids, MI (US)

(72) Inventors: Robert S. Grooters, Grand Rapids, MI (US); Mark A. Baloga, East Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 15/336,209

(22) Filed: Oct. 27, 2016

Related U.S. Application Data

(63) Continuation of application No. 14/702,156, filed on May 1, 2015, now Pat. No. 9,510,685.

(60) Provisional application No. 61/987,712, filed on May 2, 2014.

(51) Int. Cl.
| | |
|---|---|
| *A47C 7/62* | (2006.01) |
| *A47C 7/72* | (2006.01) |
| *H04N 7/14* | (2006.01) |
| *H04N 7/15* | (2006.01) |
| *H04L 29/06* | (2006.01) |

(52) U.S. Cl.
CPC ............ *H04N 7/147* (2013.01); *A47C 7/72* (2013.01); *H04L 65/1069* (2013.01); *H04N 7/142* (2013.01); *H04N 7/15* (2013.01)

(58) Field of Classification Search
CPC .. A47C 7/72; A47C 31/00; A47C 7/62; H04N 7/15; H04N 7/142
USPC ............ 297/188.01, 188.04, 188.05, 188.06, 297/188.07, 217.3, 217.4
See application file for complete search history.

(56) References Cited

U.S. PATENT DOCUMENTS

| | | | | |
|---|---|---|---|---|
| 5,000,511 A | * | 3/1991 | Shichijo ............. | B64D 11/0015 297/188.05 X |
| 5,177,616 A | * | 1/1993 | Riday ................ | B64D 11/0015 297/217.3 X |
| 6,092,868 A | * | 7/2000 | Wynn ...................... | A47C 7/72 297/188.05 |
| 6,375,259 B1 | * | 4/2002 | Ma ......................... | A47C 7/72 297/217.3 X |
| 6,425,631 B1 | * | 7/2002 | Lin ........................ | A47B 21/03 297/170 |
| 7,040,699 B2 | * | 5/2006 | Curran ................... | B60K 35/00 297/217.3 X |
| 7,111,814 B1 | * | 9/2006 | Newman ............. | B60R 11/0211 297/188.06 X |
| 7,119,829 B2 | * | 10/2006 | Leonard ................ | H04N 7/142 348/14.08 |

(Continued)

FOREIGN PATENT DOCUMENTS

WO       2014055436       4/2014

*Primary Examiner* — Rodney B White
(74) *Attorney, Agent, or Firm* — Price Heneveld LLP

(57) ABSTRACT

A method for video-teleconferencing includes providing a plurality of seating units, each adapted to support a seated user thereon such that a head of the seated user is located at a first vertical height, and providing at least one seating unit of the plurality of seating units with a display support adapted to support a display in a forwardly-facing orientation with respect to the seating unit so that the display is viewable from a position located in front of the seating unit, the display support further adapted to support the display at a second vertical height that is substantially the same as the first vertical height for use in video-conferencing applications while located on the seating unit.

25 Claims, 13 Drawing Sheets

(56) References Cited

U.S. PATENT DOCUMENTS

| | | | | |
|---|---|---|---|---|
| 7,134,719 B2* | 11/2006 | Moglin | A47C 7/72 | 297/217.3 X |
| 7,261,266 B2* | 8/2007 | Satterfield | B60R 11/0235 | 297/217.3 X |
| 7,878,476 B2* | 2/2011 | Carson | B60R 11/0235 | 211/26 |
| 8,109,569 B2* | 2/2012 | Mitchell | B60R 11/0235 | 297/217.3 X |
| 8,136,777 B2* | 3/2012 | Brawner | B60R 11/0235 | 297/188.06 X |
| 8,210,605 B2* | 7/2012 | Hough | B60N 2/4876 | 297/217.3 X |
| 8,596,599 B1* | 12/2013 | Carson | B60R 11/0235 | 211/26 |
| 8,780,167 B2* | 7/2014 | Daddi | A47C 31/00 | 348/14.08 X |
| 8,939,500 B2* | 1/2015 | Voigt | A47B 83/02 | 297/217.3 X |
| 8,955,905 B2* | 2/2015 | Boenigk | A47C 7/70 | 297/135 |
| 9,010,597 B2* | 4/2015 | Prescott | B60R 7/088 | 297/188.06 X |
| 9,220,348 B2* | 12/2015 | Stieler | A47C 7/68 | |
| 9,510,685 B2* | 12/2016 | Grooters | A47C 7/72 | |
| 2003/0057749 A1* | 3/2003 | Buono | B60N 2/44 | 297/217.3 |
| 2006/0087163 A1* | 4/2006 | Cilluffo | B60N 2/4876 | 297/188.04 |
| 2006/0169730 A1* | 8/2006 | Morrison | B60R 11/02 | 297/188.06 X |
| 2007/0263081 A1* | 11/2007 | De Beer | H04N 7/142 | 348/14.08 |
| 2009/0206641 A1* | 8/2009 | Brown, Jr. | A47C 7/72 | 297/217.3 |
| 2009/0207233 A1* | 8/2009 | Mauchly | H04N 7/144 | 348/14.08 X |
| 2009/0207234 A1* | 8/2009 | Chen | H04N 5/23238 | 348/14.09 |
| 2009/0261638 A1* | 10/2009 | Kuno | A47C 7/38 | 297/217.3 |
| 2012/0146368 A1* | 6/2012 | Oltesvig | A47C 7/72 | 297/188.04 |
| 2012/0223555 A1* | 9/2012 | Brown, Jr. | A47C 7/72 | 297/217.4 |
| 2012/0248833 A1* | 10/2012 | Hontz | B60N 3/004 | 297/188.05 |
| 2013/0010053 A1* | 1/2013 | Daddi | A47C 31/00 | 348/14.08 |
| 2013/0314852 A1* | 11/2013 | Kincaid | F16M 11/046 | 297/217.6 X |
| 2014/0015289 A1* | 1/2014 | Fan | B60N 3/004 | 297/188.05 |
| 2014/0077539 A1* | 3/2014 | Brawner | B60R 11/02 | 297/217.3 |
| 2014/0284973 A1* | 9/2014 | Wolgast | B64D 11/0015 | 297/188.04 |
| 2015/0061332 A1* | 3/2015 | Dowell | A47C 7/383 | 297/188.01 |
| 2015/0123433 A1* | 5/2015 | Lamb, Jr. | B60R 11/0229 | 297/188.05 |
| 2015/0175265 A1* | 6/2015 | Thiele | B64D 11/00152 | 297/188.04 |
| 2015/0367787 A1* | 12/2015 | Dueser | B60R 11/0235 | 297/188.05 |

* cited by examiner

OFFICE SYSTEM TELEPRESENCE ARRANGEMENT

BACKGROUND OF THE INVENTION

The present invention relates to a seating unit that supports a display for use within office settings conducive to video-conferencing applications.

BRIEF SUMMARY OF THE INVENTION

One aspect of the present invention is to provide a method for video-teleconferencing that comprises providing a plurality of seating units, each adapted to support a seated user thereon such that a head of a seated user is located at a first vertical height, and providing at least one seating unit of the plurality of seating units with a display support adapted to support a display in a forwardly-facing orientation with respect to the seating unit so that the display is viewable from a position located in front of the seating unit, wherein the display support is further adapted to support the display at a second vertical height that is substantially the same as the first vertical height for use in video-teleconferencing applications while located on the seating unit.

The principal objects of the present invention are to provide a video-conferencing office system, and in particular a seating unit within a video-conferencing office system that supports a display between a storage position and at least one of a plurality of in-use positions, wherein the display is supported at a vertical height substantially similar to the vertical height of the head of a seated user, thereby promoting face-to-face communication between an on-site participant and a remote user. The seating unit further provides the ability to support multiple displays from a single seating unit and provide adequate viewing thereof even when a seated user is positioned within the seating unit. The seating unit may be utilized within conventional seating arrangements, is highly efficient in use and increases the overall effectiveness of a given office system by leveraging the space between on-site conference participants, and is particularly well adapted for the proposed use.

These and other advantages of the present invention will be further understood and appreciated by those skilled in the art by reference to the following written specification, claims, and appended drawings.

DETAILED DESCRIPTION OF THE PREFERRED EMBODIMENTS

Figure 1:
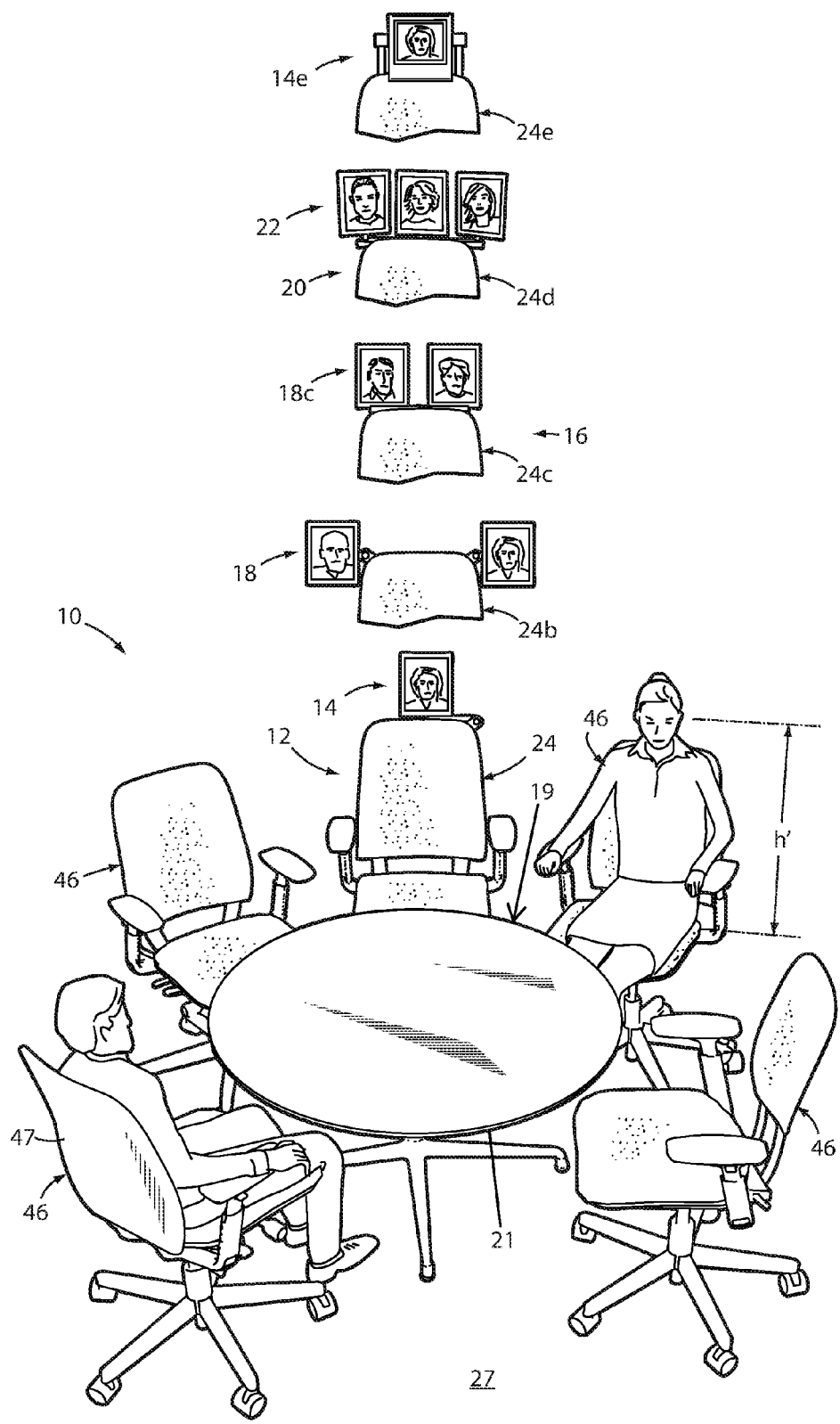
FIG. 1 is a perspective view of a video-conferencing office system including variations of a display-supporting seating unit positioned therein.

For purposes of description herein, the terms "upper," "lower," "right," "left," "rear," "front," "vertical," "horizontal," and derivatives thereof shall relate to various embodiments of the invention as oriented in the figures described below. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Workers today often desire to communicate with individuals who may be located in another physical place. For example, individuals who wish to communicate may be located in different cities, different buildings on a corporate campus, different floors or offices within a building, or one worker may be working remotely from his home or travel destination. Additionally, many workers seek out "third-spaces" such as coffee shops, libraries, or outdoor venues as work spaces, and may desire to communicate with an individual who is not also present at the selected third-space. Video communication is often the preferred method of communication between individuals because it affords the ability to communicate similarly to in-person communications. For example, individuals communicating via video may verbally exchange information while still perceiving non-verbal information related to the other participant or participants and the environment.

In today's office environments, specific conference rooms are often designated for video communication and include the equipment necessary for video communication, namely a camera and a display. These rooms may be so equipped at great cost. Other conference rooms and shared spaces may lack dedicated equipment for video communication, and rarely will individual work spaces include the necessary components. However, may workers carry one or more devices that allow for video communication, such as a tablet or phone.

Using one of these devices may allow for video communication, but may present a number of challenges depending on the environment. For example, laying a device on a work surface, such as a desk, may make it difficult for a remote participant (visible on the screen of the device) to view fully the environment of the on-site participant. If there are multiple on-site participants communicating with the remote participant, the remote participant may not be able to see both on-site individuals simultaneously. Utilizing a desk-top stand for a device may cause the remote participant to view the on-site participant and environment from an angle that would be avoided during in-person communication. In some instances, an on-site participant may feel uncomfortable with the way he or she may be displayed to the remote participant due to this angle. Further, the positioning of the device on a table may cause the on-site individuals to adjust or limit the way they communicate with each other. This may result in awkward and less productive communications.

Various embodiments address these challenges by elevating the device to a location that more closely mimics in-person communication. Often video communication applications will display the upper body or head of a remote participant. Therefore, the video communication will be improved by positioning the display relative to an on-site chair such that the image of the remote participant's head is approximately at or near the likely location of the participant's head should he or she physically occupy the chair. Various embodiments described below illustrate how a device might be positioned relative a chair or general office environment to better mimic in-person communication and improve the experience of all participants. Moreover, today's physical office environment requires maximizing the use of limited floor plan space, and various embodiments disclosed herein leverage the often unutilized and valuable space located between seated, on-site conference participants, such as the open area between chairs or other seating arrangements.

The reference numeral 10 (FIG. 1) generally designates an office system that includes multiple seating units 12 embodying the present invention. In the illustrated example, the office system 10 includes a seating unit 12, supporting a single display arrangement 14, a seating unit 16 supporting a dual display arrangement 18, a seating unit 18c supporting a dual display arrangement 18c, a seating unit 20 supporting a triple display arrangement 22, and a seating unit supporting a headrest, single display arrangement 14e, each positioned about a table 19 that includes a worksurface 21. Although various display arrangements are illustrated in the present example, it is noted that other variations of single and multiple displays may be included.

Figure 2:
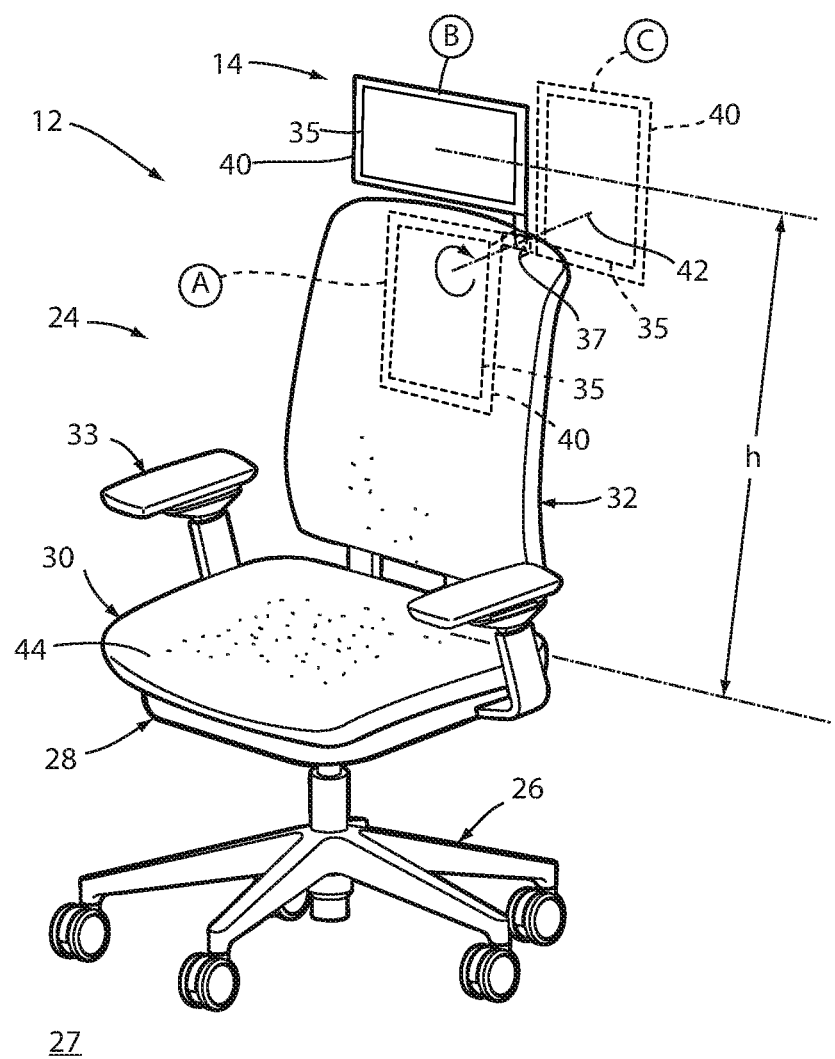
FIG. 2 is a perspective view of a first embodiment of a seating unit.

As best illustrated in FIG. 2, the seating unit 12 includes a chair assembly 24 that includes a pedestal support assembly 26 that supports the chair assembly 24 above a floor surface 27, a control assembly 28 supported by the pedestal support assembly 26, a seat assembly 30 and a back assembly 32, wherein the seat assembly 30 and the back assembly 32 are supported by the control assembly 28.

As illustrated, the display arrangement 14 includes a single display 35 pivotably supported from the back assembly 32 by a display support assembly 37. In the illustrated example, the display 35 comprises a video-conferencing handheld device such as a tablet releasably supported within a display support 40. Although the video-conferencing handheld device comprises a table in the illustrated example, other suitable video-conferencing handheld devices such as portable computers, phones and the like, may be utilized. While the display support 40 is configured to allow a user to easily attach or couple the display 35 to the display support 40, alternatively, the display 35 may be permanently affixed to or integrally formed with the associated display support 40. The display support assembly 37 allows the display 35 to be moved between a storage position and a plurality of in-use positions. Specifically, the display support assembly 37 is adapted to allow the display 35 to be pivoted about a pivot axis 42, such that the display 35 is pivotable between a storage position A, wherein the display 35 is positioned behind the back assembly 32, and a variety of in-use positions. In a first in-use position B, the display 35 is positioned directly above the back assembly 32 and does not extend significantly beyond the sides of the back assembly 32. In a second in-use position C, the display 35 is positioned vertically and at least partially to the side of the back assembly 32. In-use position C allows an on-site participant to view the display 35 while another on-site participant is seated within the chair assembly 24. Alternatively, the chair assembly 24 and the display support assembly 37 may be configured such that the display 35 is located within an internal cavity (not shown) of the chair assembly 24 when the display 35 is in the storage position A.

As best illustrated in FIG. 2, the seating unit 12 is configured such that the display arrangement 14 positions the display 35 at or near a natural head-height of a seated participant when the display 35 is positioned within the first in-use position B or the second in-use position C. Specifically, the display 35 is located at a height h above an upper seating surface 44 of the seat assembly 30 when the display 35 is in the first in-use position B or the second in-use position C. The height h is substantially the same as the height h' (FIG. 1) of the head of a seated user positioned within a chair assembly 46 that is similarly configured to the chair assembly 24. Preferably, the display 35 is positioned between about 26 inches and about 34 inches above the seating surface or seat support surface 44, more preferably between about 27 inches and about 33 inches above the seat support surface 44, and most preferably between about 29 inches and about 31 inches about the seat support surface 44. Positioning the display 35 at the height h and its relationship and substantial similarity to the height h' of the head of a seated user provides a natural viewing height for on-site participants of remote participants through the display 35, thereby facilitating a more natural conference-like setting that mimics more closely in-person communication. In addition, when an on-site user is seated in chair assembly 24 and display 35 is positioned in in-use position C, the remote participant will have a view of the on-site discussion that mimics the seated user's view. This may improve the remote participant's satisfaction with the communication, because he or she may be naturally turned to face a speaker or display space within the room as the seated user moves chair assembly 24 to face the speaker or display area.

Figure 3:
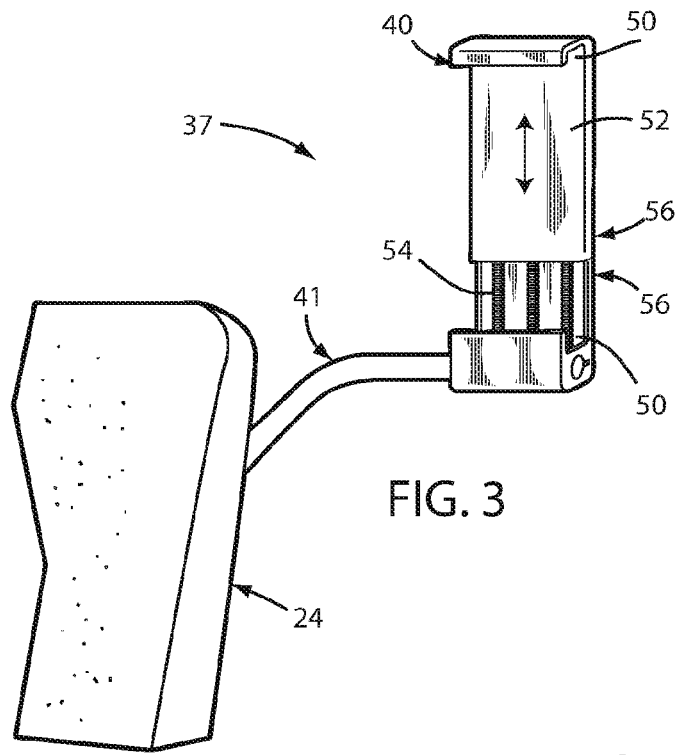
FIG. 3 is a perspective view of a pivotable display support assembly.

FIG. 3 illustrates an embodiment of display support assembly 37. Display support assembly 37 includes display support 40 and arm 41. Display support 40 includes two channels 50 that are coupled together via backing 52. Channels 50 are dimensioned to cradle an edge of a display. In some embodiments, channels 50 may be covered with rubber or other tacky material to prevent or lessen movement of the display when positioned in channels 50. Backing 52 includes springs 54 and sliding portions 56.

Sliding portions 56 move with respect to each other and allow the distance between channels 50 to increase and decrease to accommodate a variety of device sizes and to accommodate the rotation of a device between landscape and portrait orientations. Springs 54 allow channels 50 to be pulled apart to insert or extract a device and provide tension to secure the device between channels 50. Springs 54 may be selected by spring force to ensure that the spring force is substantially greater than a gravitational force associated with the heaviest display intended to be used with the display support assembly 37. In various embodiments, display support 40 may too include additional channels, orientated at a 90 degree angle from channels 50, such that each edge of a device is held within a channel. Additionally or alternatively, display support 50 may hold two or more corners of a device. Some embodiments may omit springs 50 and may instead create tension between channels 50 in a variety of known ways.

Arm 41 is pivotably coupled to a chair, such as chair assembly 24. It may be formed integrally with one or more of the components of display support 40, for example with one channel 50. Arm 41 may also be affixed to display support 40 in a variety of known methods. Arm 38 and/or display support 40 may be permanently coupled to a chair or may be releasably coupled such that a participant can remove the display support, insert his device, and then re-couple it to a chair. In certain embodiments, display support 37 may include various additional or alternative components adapted to position the device at or near the height of a participant's head. For example, display support assembly may include a flexible neck and/or a mounting cup that relies in full or in part on suction to couple a display mount to a component of the chair, a sheath-style rigid member 610 (FIG. 4) that encloses one or more edges of the display, and a variety or other related or known components suitable to position the device appropriately.

The reference numeral 14a (FIG. 5) generally designates a single display arrangement slidably supported from a chair assembly 24a. Since the display arrangement 14a and the chair assembly 24a are similar to the previously described display arrangement 14 and chair assembly 24, similar parts appearing in FIGS. 2-4 and FIGS. 5-6, respectively are represented by the same, corresponding reference numeral, except for the suffix "a" and the numerals of the latter. The display arrangement 14a includes a display support 40a slidably supported from back assembly 32a of the chair assembly 24a by a slider arrangement 100 that is adapted to allow the display 35 to be moved in a direction 102 and a direction 103 between a first in-use position D located directly above the back assembly 32a and not extending significantly beyond the sides of the back assembly 32a, and a second in-use position E located at least partially to the side of the back assembly 32a, thereby allowing use of viewing of the display 35 from a position located in front of the back assembly 32a while an on-site user is seated within the chair assembly 24a. In various embodiments, the display support 40a may additionally or alternatively slide to an in-use position located partially or fully to the other side of the back assembly 32a. As noted above with respect to display arrangement 14, the display unit 14a is configured to position the display 35 at a vertical height h above the seating support surface 44a, wherein the height h is substantially the same as the height h'. Positioning the display 35 at the height h and its relationship and substantial similarity to the height h' of the head of the seated user provides a natural viewing height for on-site participants of remote participants through the display 35, thereby facilitating a more natural conference-like setting that mimics more closely in-person communication. In addition, when an on-site user is seated with chair assembly 24 and display 35 is positioned in in-use position E, the remote participant will have a view of the on-site discussion that mimics the seated user's view. This may improve the remote participant's satisfaction with the communication, because he or she may be naturally turned to face a speaker or display space within the room as the seated user moves chair assembly 24.

Figure 4:
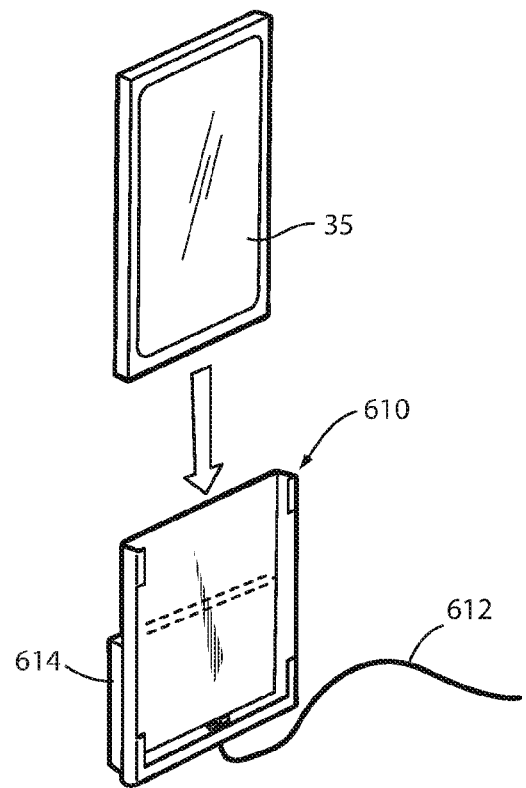
FIG. 4 is a perspective view of a sheath-style display support assembly.
Figure 5:
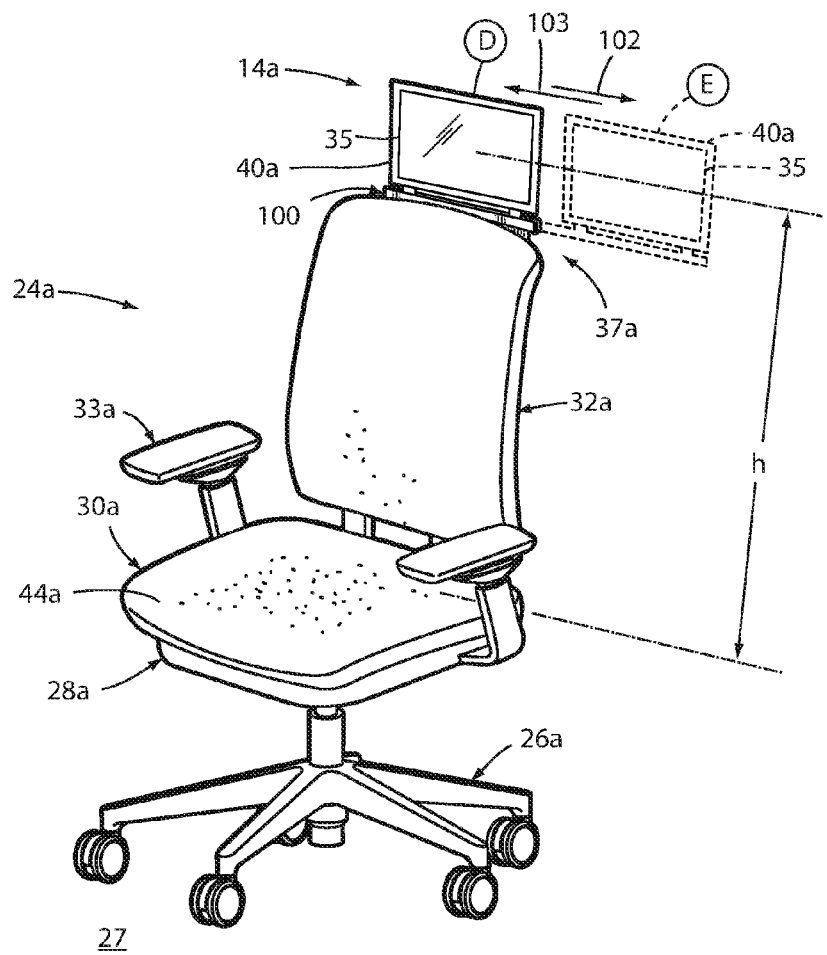
FIG. 5 is a perspective view of an alternative embodiment of the seating unit.

As best illustrated in FIG. 4, the display support assembly may also include a power source to provide power to the display 35, such as an electrical line 612, and/or a battery module 614, which may be used separately or in tandem with one another. While the electrical line 612 and battery module 614 are illustrated with respect to the display support assembly as illustrated in FIG. 4, these and other power supply arrangements may of course by incorporated into other embodiments of the display support assembly as shown and described herein.

Figure 6:
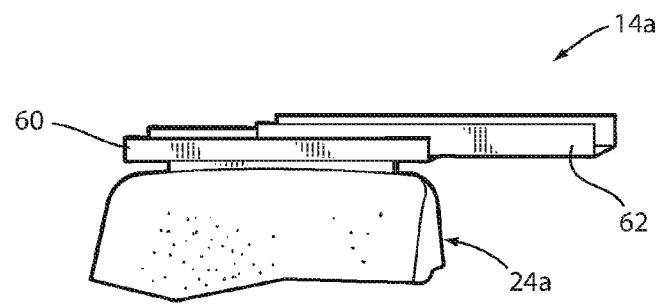
FIG. 6 is a perspective view of a slidable display support assembly.

FIG. 6 illustrates display arrangement 14a. Display arrangement 14a comprises an outer channel 60 and inner channel 62. Outer channel 60 is generally U-shaped and includes two side walls and a bottom wall. The interior surfaces of the side walls and bottom wall create an interior space that is dimensioned to support inner channel 62. Inner channel 62 may slide horizontally in one or more directions with respect to outer channel 60. Inner channel 62 may be removable from outer channel 60. In some embodiments, outer channel 60 may include a stop that prevents inner channel 62 from sliding in a particular direction. Outer channel 60 may be coupled to a chair back assembly in a variety of ways.

Inner channel 62 is also generally U-shaped and includes two side walls and a bottom wall. The interior surfaces of the side walls and bottom wall create an interior space that is dimensioned to support or cradle an edge of a display device. In some embodiments, inner channel 62 may be covered with rubber or other tacky material to prevent or lessen movement of the display when positioned within inner channel 62.

Figure 7:
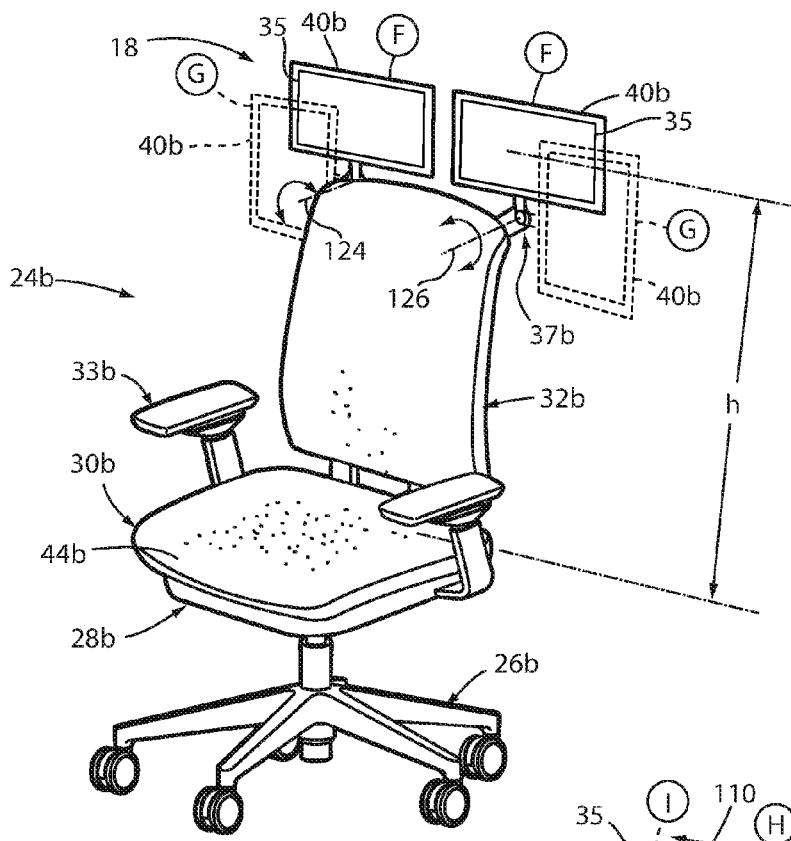
FIG. 7 is a perspective view of another alternative embodiment of the seating unit.

The reference numeral 18 (FIG. 7) generally designates the dual display arrangement that includes a pair of displays 35 each pivotably supported from the back assembly 32b of the chair assembly 24b by the display support assembly 37b. Since the display arrangement 18 and the chair assembly 24b are similar to the previously described display arrangement 14 and chair assembly 24, similar parts appearing in FIGS. 2-4 and FIG. 7, respectively are represented by the same, corresponding reference numeral, except for the suffix "b" and the numerals of the latter. The display arrangement 18 includes a pair of display supports 40b configured similarly to display support 40 and pivotably supporting a corresponding pair of displays 35, such that the displays 35 are pivotable about respective axes 124, 126 between first in-use positions F located at least partially above the back assembly 32b, and second in-use positions G located at least partially to the side of the back assembly 32b, thereby allowing use of viewing of each of the displays 35 from a position located in front of the back assembly 32b while an on-site user is seated within the chair assembly 24b. It is noted that in the illustrated example, each display support assembly 37b is separately adjustable, and that one display support 40b may be in the first in-use position F, while the other display support 40b may be in the second in-use position G. As noted above with respect to display arrangement 14, the display unit 18 is configured to position the displays 35 at or near a vertical height h above the seating support surface 44c, wherein the height h is substantially the same as the height h'.

Figure 8:
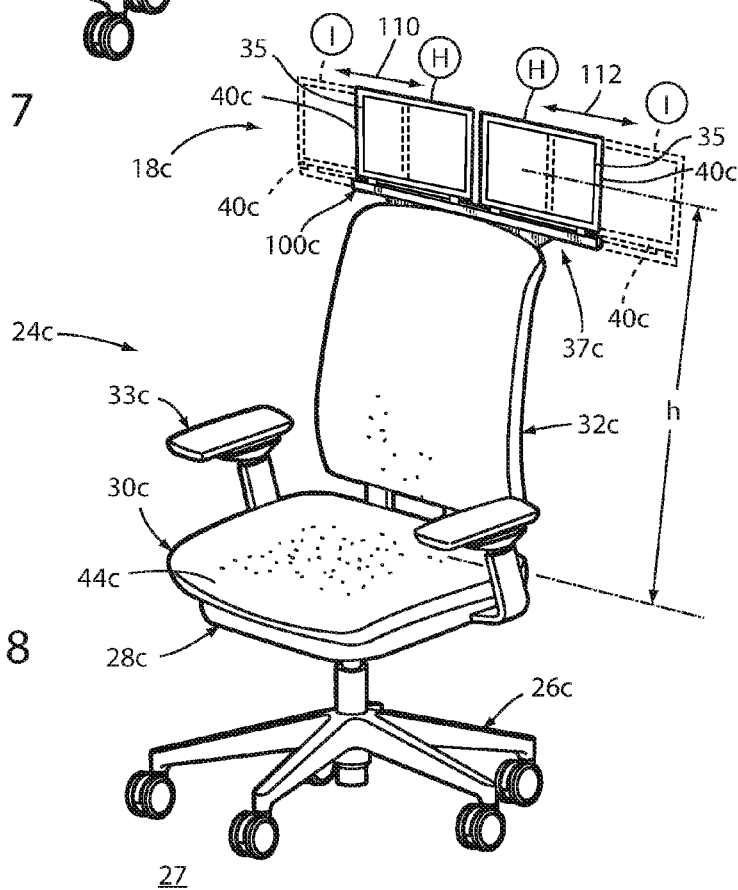
FIG. 8 is a perspective view of yet another alternative embodiment of the seating unit.

The reference numeral 18c (FIG. 8) generally designates a dual display arrangement slidably supported from a chair assembly 24c. Since the display arrangement 18c and the chair assembly 24c are similar to the previously described display arrangement 14a and chair assembly 24a, similar parts appearing in FIGS. 2-4 and FIG. 8, respectively are represented by the same, corresponding reference numeral, except for the suffix "c" and the numerals of the latter. The display arrangement 18c includes a pair of display support 40c configured similarly to the display support 40a and slidably supporting a corresponding pair of displays 35 from back assembly 32c of the chair assembly 24c by a slider arrangement 100c that is configured similarly to the slider arrangement 100. The slider arrangement 100c is adapted to allow the displays 35 to be moved in sliding, linear directions 110, 112, respectively, between first in-use positions H located at least partially above the back assembly 32c, and second in-use positions I located at least partially to a side of the back assembly 32c, thereby allowing viewing of the displays 35 while an on-site user is seated within the chair assembly 24c. It is noted that in the illustrated example, each display support 40c is separately adjustable, and that both display supports 40c may be in similar positions or one display support 40c may be in the first in-use position H, while the other display support 40c may be in the second in-use position I. As noted above with respect to display arrangement 14, the display unit 18a is configured to position the displays 35 at or near a vertical height h above the seating support surface 44c, wherein the height h is substantially the same as the height h' illustrated in FIG. 1.

Figure 9:
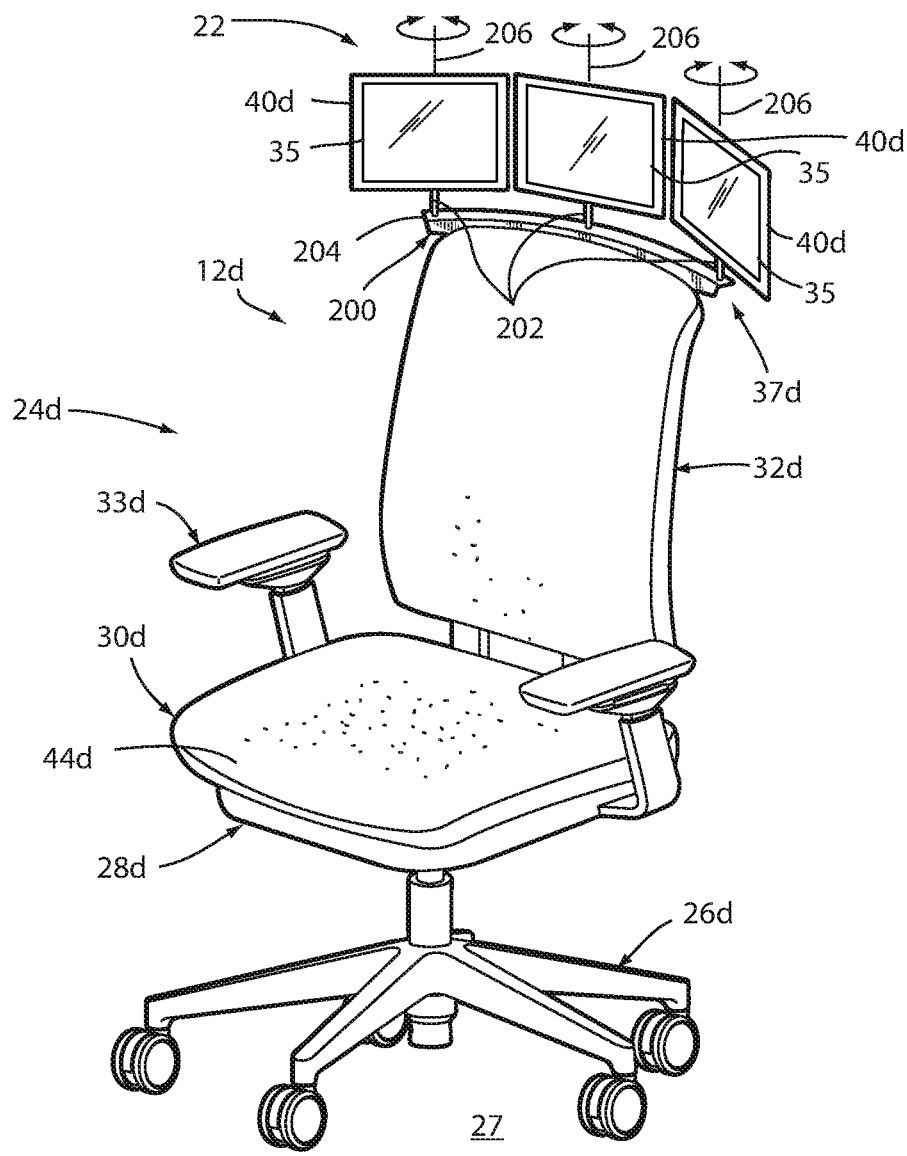
FIG. 9 is a perspective view of still yet another alternative embodiment of the seating unit.
Figure 10:
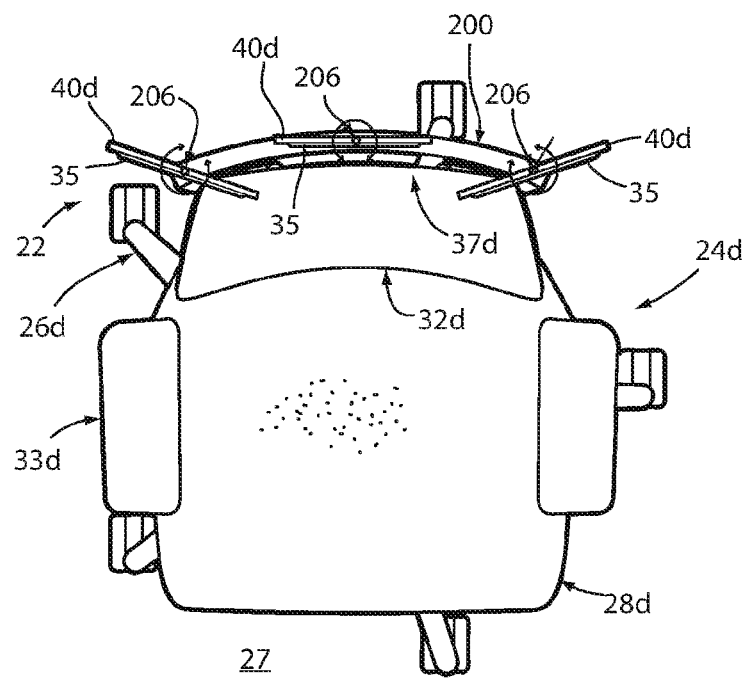
FIG. 10 is a top plan view of the alternative embodiment of the seating unit of FIG. 9.

The reference numeral 22 (FIGS. 9 and 10) generally designates a triple display arrangement pivotably supporting a plurality of displays 35 from a chair assembly 24d. Since the display arrangement 22 and the chair assembly 24d are similar to the previously described display arrangement 14 and chair assembly 24, similar parts appearing in FIGS. 2-4, 9 and 10, respectively are represented by the same, corresponding reference numeral, except for the suffix "d" and the numerals of the latter. The display arrangement 22 includes a plurality of display supports 40d pivotably supported from back assembly 32d of the chair assembly 24d by a pivot support arrangement 200. The pivot support arrangement 200 includes a plurality of pivot assemblies 202 supported from the back assembly 32d by a support member 204. Each pivot assembly 202 is adapted to allow an associated display 35 to move about a pivot axis 206 such that each display 35 is pivotable with respect to the back assembly 32d and independently pivotable with respect to one another, such that each of the displays 35 may individually face various and different areas of the video-conferencing system and surrounding area. As noted above with respect to the display arrangement 14, the display arrangement 22 is configured to position the displays 35 at or near a vertical height h above the seating surface 44c, wherein the height h is substantially the same as the height h'. In various embodiments, a remote user may be able to control the position of the display, such that he or she can pivot the display remotely. This may allow the remote user to face an on-site speaker more directly or allow the remote user to scan the room while the remote user is speaking. Power to allow remoter control of the display may come from a power source coupled to the chair like a battery or from the display itself.

Figure 11:
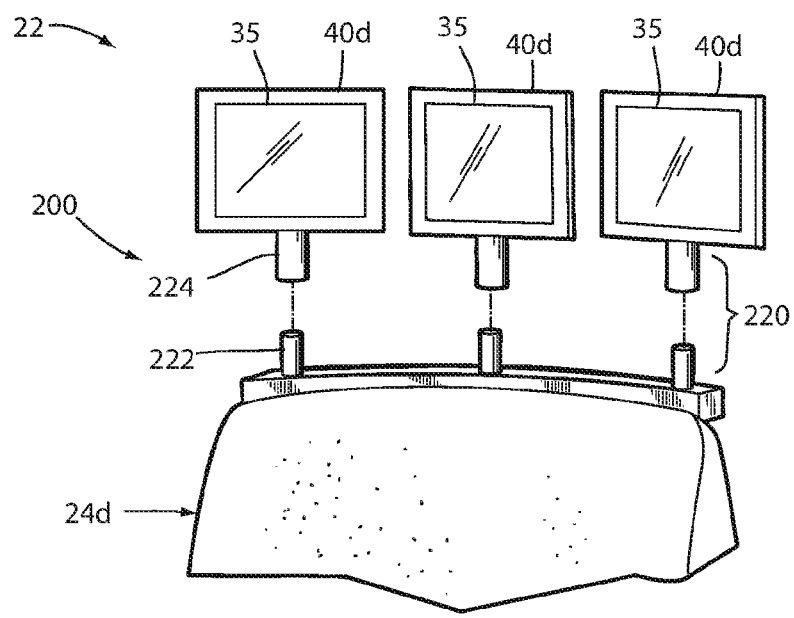
FIG. 11 is a perspective view of a pivotable display support assembly.

FIG. 11 illustrates display arrangement 22. Display arrangement 22 includes display supports 40d pivotably supported from pivot support arrangement 200. Pivot support arrangement 200 includes pivot assemblies 220 adapted to pivotably support the display supports 40d. Each pivot assembly 220 includes a pivot pin 222 pivotably received within pivot tube 224. Each pivot pin 222 is coupled with the overall chair assembly 24d, while each pivot tube 224 is coupled with a corresponding display support 40d. Each pivot tube 224 may be removed from the associated pivot pin 222, thereby allowing a user to remove a display support 40d from pivot support arrangement 200, couple or uncouple display 35 to or from the display support 40d, and return the display support 40d to the pivot support arrangement 200.

Figure 12:
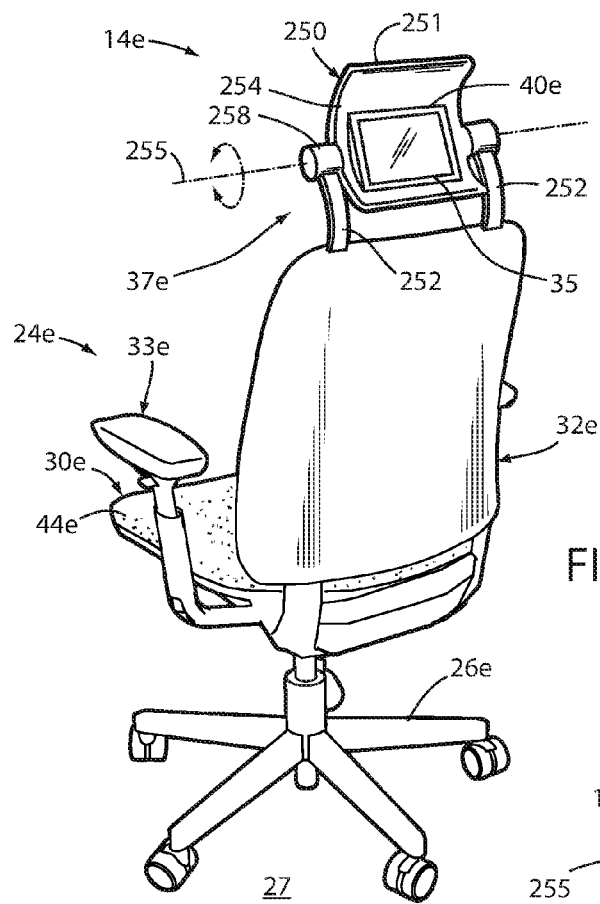
FIG. 12 is a rear perspective view of another alternative embodiment of the seating unit.
Figure 13:
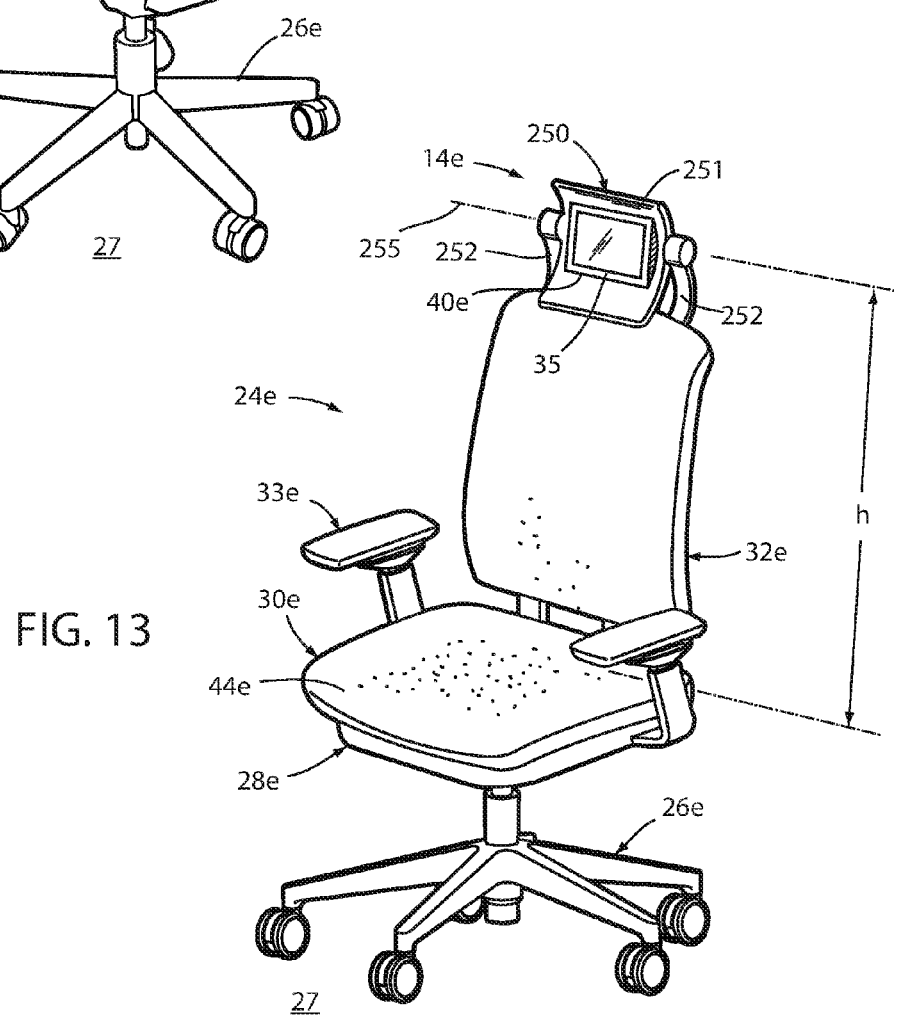
FIG. 13 is a front perspective view of the alternative embodiment of the seating unit of FIG. 12.
Figure 14:
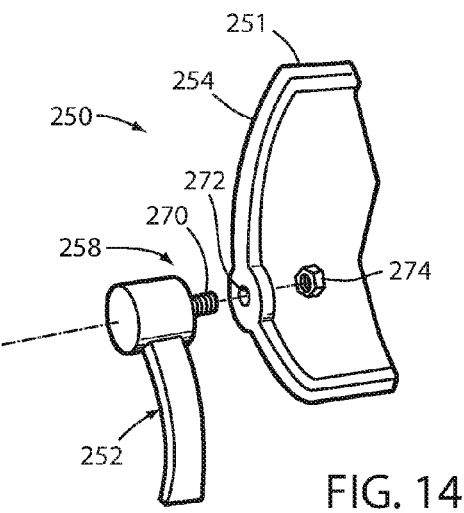
FIG. 14 is an exploded perspective view of a pivot assembly.

The reference numeral 14e (FIGS. 12 and 13) generally designates a single display arrangement that includes a display 35 supported from the back assembly 32e from the chair assembly 24e by a reversibly pivoting headrest assembly 250. Since the display arrangement 14e and the chair assembly 24e are similar to the previously described display arrangement 14 and the chair assembly 24, similar parts appearing in FIGS. 2-4 and FIGS. 10 and 11, respectively are represented by the same, corresponding reference numeral, except for the suffix "e" and the numerals of the latter. The headrest assembly 250 includes a pair of headrest supports 252 extending upwardly from the back assembly 32 and pivotably coupled to the sides of a headrest frame 254 such that the headrest frame 254 may be pivoted about an axis 255 between a first position as shown in FIG. 12 and a second position as shown in FIG. 13. In the first position shown in FIG. 12, the support surface 251 is in a position to support the head of a seated user. In the second position shown in FIG. 13, the support surface 251 pivots approximately 180 degrees such that it is above the rear side of the back assembly 32e and the display 35 faces toward the front of the chair assembly 24e and is viewable from a position in front of the chair assembly 24e. The headrest frame 254 (FIG. 14) is pivotably supported by a pair of pivot assemblies 258 Each pivot assembly 258 includes a pivot shaft 270 extending inwardly from an associated headrest support 252 and pivotably received within a corresponding pivot aperture 272 extending into the headrest frame 254. Each pivot shaft is secured within the corresponding pivot aperture 272 by a fastener 274. As noted above with respect to the display arrangement 14, the display arrangement 14e is configured to position the display 35 at or near a vertical height h above the seat support surface 44e, wherein the height h is substantially the same as height h' illustrated in FIG. 1.

Figure 15:
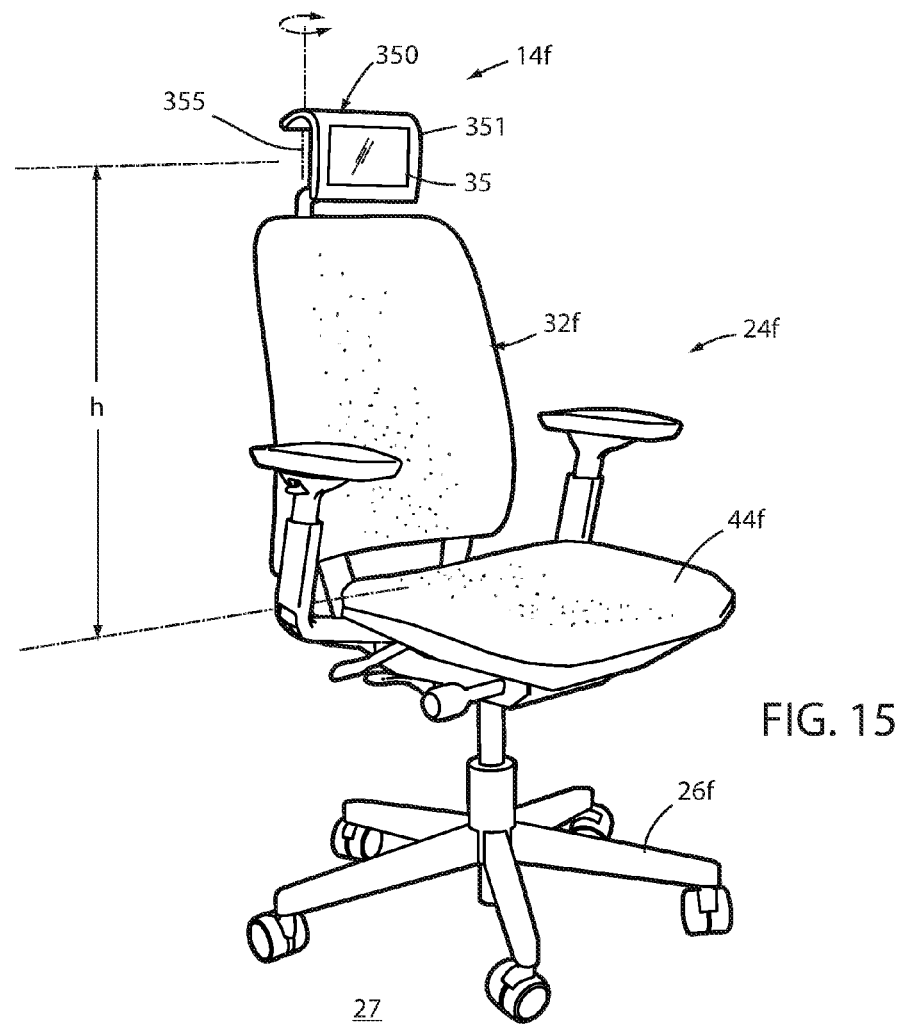
FIG. 15 is a perspective view of yet another alternative embodiment of the seating unit.

FIG. 15 illustrates another embodiment of a headrest and a display. The reference numeral 14f generally designates a single display arrangement that includes a headrest assembly 350, a support surface 351, and a display 35. Headrest assembly 350 is supported above a seat assembly 44f from a back assembly 32f by a post-style coupling that positions support surface 351 above back assembly 32f at a position suitable to support a seated user's head. In some embodiments, headrest assembly 350 may move from side to side along the upper side of back assembly 32f. Additionally or alternatively, headrest assembly 350 may pivot about an axis 355.

Support surface 351 includes display 35. In some embodiments, display 35 may be integrally formed with support surface 351 and support surface 351 may be an emissive surface, for example, a surface that can be driven by a computer to present information to on-site participants. To facilitate video communication, headrest assembly 350 may include a processor, one or more wireless access points, a database, and/or other suitable components. In particular embodiments, support surface 351 may be constructed to receive a device that includes display 35. For example, support surface 351 may be constructed to include a pocket suitable to receive and retain a device that includes display 35. Similarly to FIGS. 12 and 13, display arrangement 14f is configured to position display 35 at or near a vertical height h above the seat support surface 44*f*, wherein the height h is substantially the same as height h' illustrated in FIG. 1.

Figure 16:
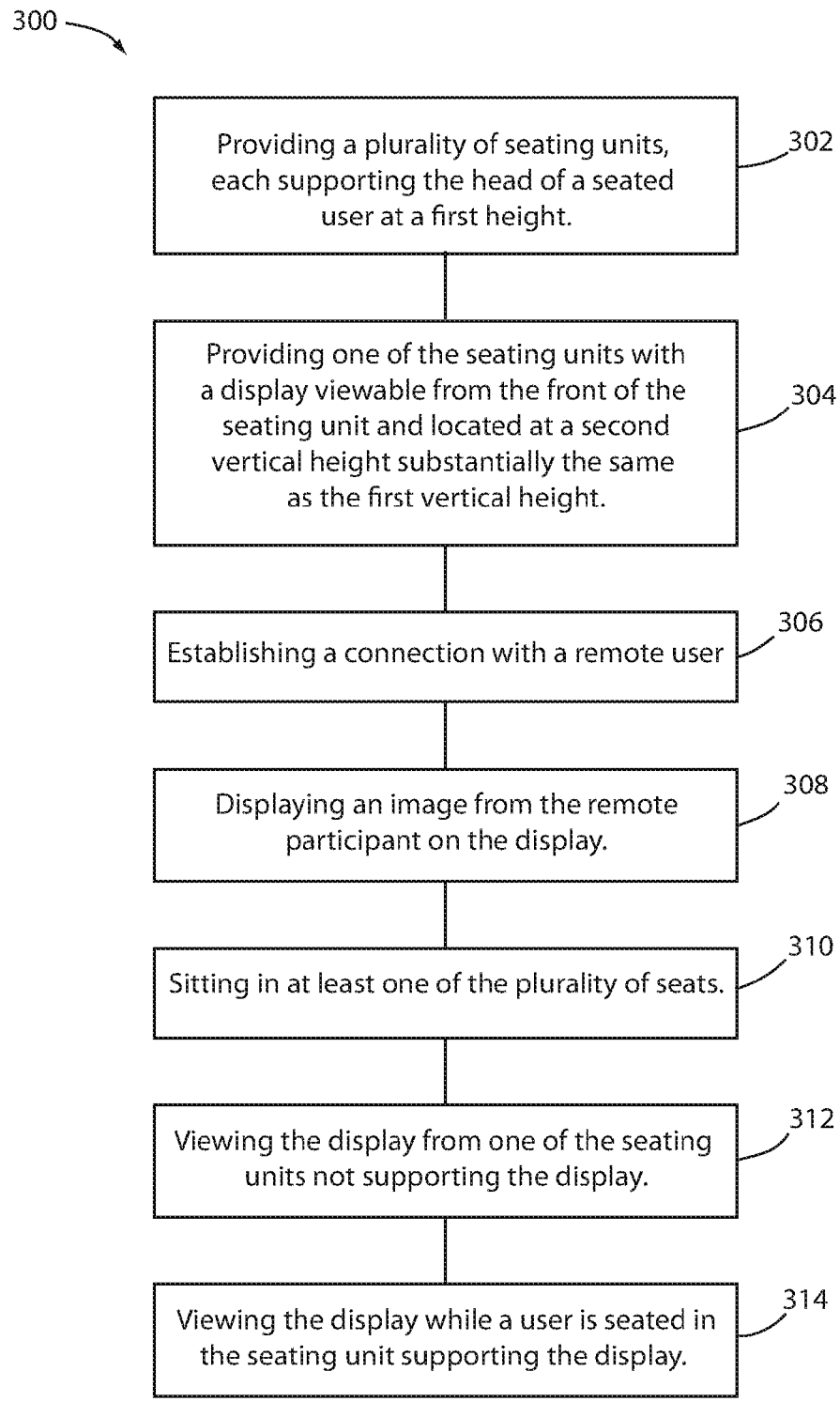
FIG. 16 is a flow chart of a method of video-teleconferencing.

FIG. 16 illustrates a method 300 for video-teleconferencing in accordance with the various embodiments. Method 300 begins with a step 302 of providing a plurality of seating units, each adapted to support a seated user thereon such that the head of the seated user is located at a first vertical height. The method 300 continues by including the step 304 of providing at least one seating unit of the plurality of seating units with a display support adapted to support a display in a forwardly-facing orientation with respect to the seating unit so that the display is viewable from a position in front of the seating unit. In addition, the display support is further adapted to support the display unit at a second vertical height that is substantially the same as the first vertical height for use in video-conferencing applications while located on the seating unit. The method 300 may then include the step of establishing a connection with a remote user, the step 308 of displaying an image from the remote user on the device, the step 310 of sitting in at least one of the plurality of seats, and the step 312 of viewing the display from one of the seating units not supporting the display. The method 300 may further include the step 314 of viewing the display while a user is seated in the seating unit supporting the display.

Figure 17:
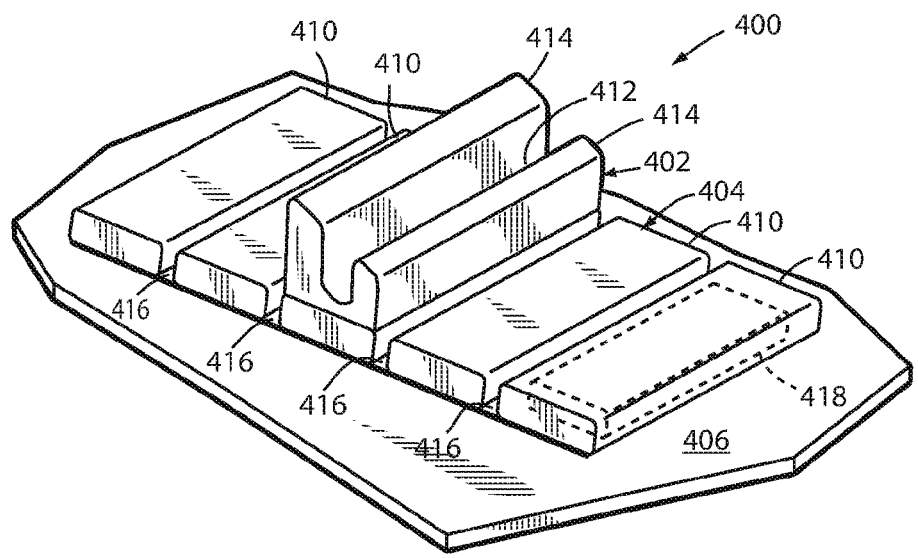
FIG. 17 is a perspective view of a video-communication handheld device support.
Figure 18:
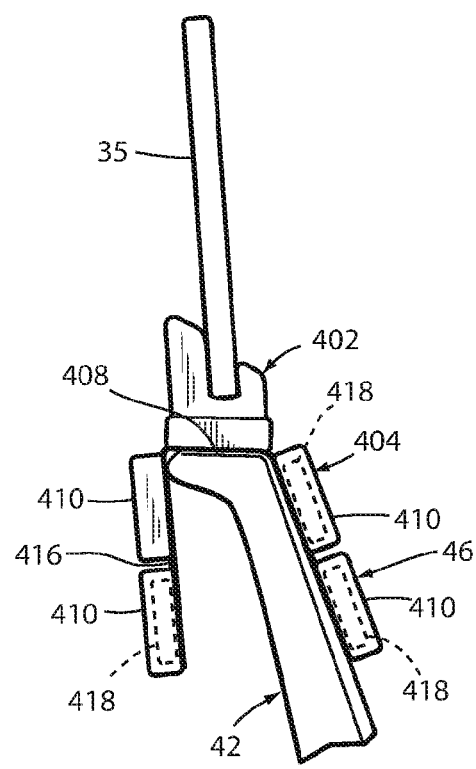
FIG. 18 is a side view of the device support of FIG. 17.

The reference numeral 400 (FIGS. 17 and 18) generally designates a video-communication handheld device support that includes a support 402 adapted to releasably position a video-communication enabled handheld device or display 35 in a generally vertical orientation therefrom when the support 402 is in an upright position, and a flexible body 404 attached to the support 402. The body 404 is capable of being arranged in a first configuration (FIG. 17) that positions the support 402 in a stable upright position above a generally horizontal surface 406, such as a table, cabinet, or shelf. The body 404 is also capable of being arranged in a second configuration (FIG. 18) that positions the support 402 in a stable upright position above or on a narrower horizontal surface 408, such as a chair back or partition wall.

In the illustrated examples, the support 402 includes a laterally-extending groove 412 defined between a pair of raised portions 414, wherein one of the raised portions 414 extends to a greater height than the other of the raised portions 414. The flexible body 404 includes a plurality of laterally-elongated segmented portions 410 connected to one another via a flexible web 416. In the second configuration shown in FIG. 1, the segmented portions 410 extend below and on either side of the narrow surface 408.

In the illustrated example, the support 402, the segmented portions 410, and the web 416 comprise a fabric; however other suitable materials may also be utilized. The support 402 may either be permanently affixed to one of the segmented portions 410 or releasably coupled thereto via a plurality of magnets (not shown), hook-and-loop type fasteners, or other suitable attachments. In some embodiments, the support 402 may be pivotably affixed to one of the segmented portions, such that a coupled display may be pivoted with respect to the underlying surface. Further, the segmented portions 414 may be weighted, so as to properly balance and stabilize the support 402 above a narrow surface and inhibit the movement of the device support 400. In some instances, the weight for the segmented portions 410 may be in the form of a battery 418 adapted to provide power to the display 35, or magnets positioned so as to attract to one another through the chair back assisting to secure and/or stabilize the support 402. The device support 400 may be utilized to provide stable and adjustable support of a display 35 above other furniture or non-furniture related surfaces in a variety of settings which improves video-conferencing capabilities within an office which offers a variety of variously configured supported surfaces uniquely positioned to mimic in-person communication. These various office configurations include settings without formal video-conferencing settings, but within which numerous on-site meeting participants may meet, including individual offices and cubicles, small conferencing rooms, technical or laboratory rooms, class rooms, and the like. Benefits include the ability to easily transform any chair into a telepresence chair, transform any environment with a flat surface into a video-conferencing environment, such as any environment that includes a worksurface or shelving. Benefits also include the ability of a user to set up display such that he can video-conference without having physically to hold the display allowing for hands-free video-conferencing and hands free engagement with the tablet.

Figure 19:
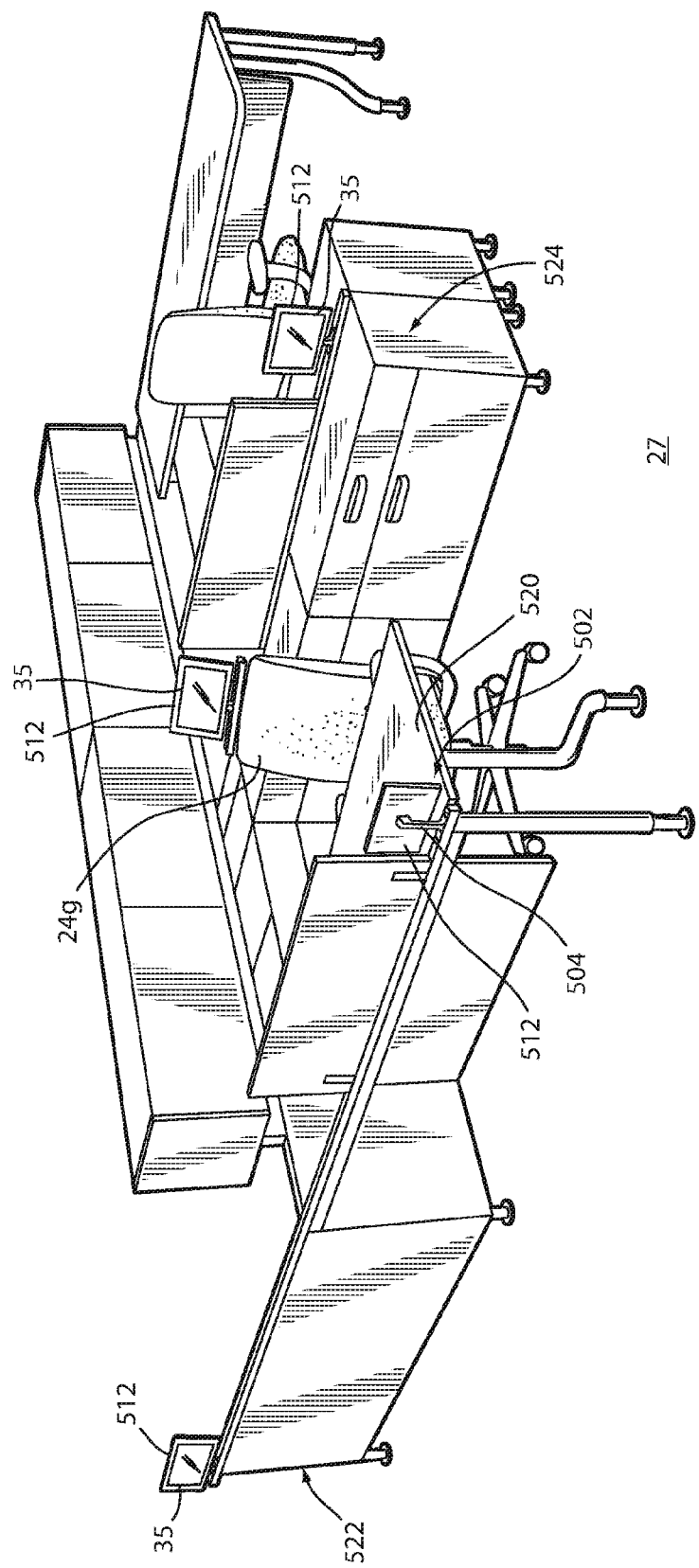
FIG. 19 is a perspective view of video-conferencing furniture system.
Figure 20:
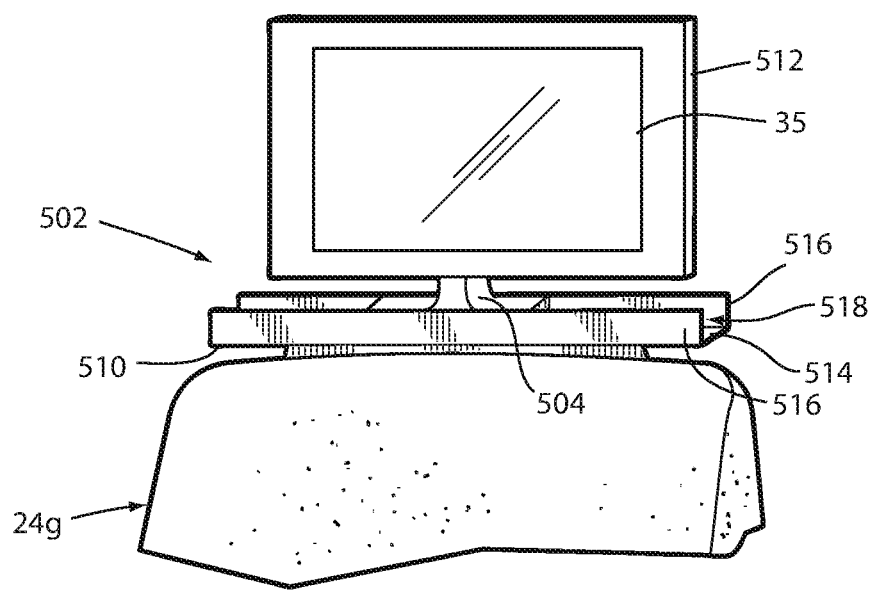
FIG. 20 is a perspective view of another alternative embodiment of the seating unit.

FIG. 19 illustrates a furniture system 500 that includes a display support 502 supporting a display 35 in a generally upright orientation for video-conferencing applications, wherein the display support 502 (FIG. 20) includes a first connector 504 releasably received within a second connector 510. In the illustrated example, the first connector is either fixedly or removably attached to a display support 512 that releasably supports a display 35. The second connector 510 includes an elongated channel secured to the overall chair assembly 24*g*. The channel 510 includes a bottom wall 514 and a pair of side walls 516 that cooperate to form a track 518 within which the first connector 504 is slidably and releasably received. The display support 502 is configured to position the display 35 at a vertical height that is substantially similar to the height h' of the head of a seated user to provide a natural viewing height for on-site participants.

Using connector 504 allows a user to move display 35 to various positions within an office environment (FIG. 19) which improves ease of video-conferencing between various office configurations by allowing on-site participants easily and conveniently to move the display 35 from location to location without requiring mounting and unmounting of the display 35 from the display support 512. For example, the display support 512 may be alternatively supported by and moved between a chair assembly 24*a*, a worksurface or desk arrangement 520, a partition wall 522, storage units 524, and the like. Benefits include the ability to easily transform a location with a coupler arrangement into a video-conferencing environment. Benefits also include the ability of a user to set up the display such that he can video-conference without having to hold the display, thereby allowing for hands-free video-conferencing and hands-free engagement with the display. In some embodiments, on-site participants may also use displays to view and interact with data.

The present inventive video-conferencing office system, and in particular the seating unit with the video-conferencing office system is adapted to promote and facilitate face-to-face communication between an on-site participant and a remote user by supporting either one or a plurality of displays at a vertical height substantially similar to the height of the head of a seated person. It is noted that the various inventive concepts as disclosed herein may be combined with one another so as to provide a highly effective and flexible display supporting arrangement allowing one or a plurality of displays to be supported and viewed from a position in front of a seating unit, even when that seating unit is being utilized by an on-site participant. Although several embodiments are illustrated in connection within an office environment, the inventive concepts disclosed herein may be utilized in conjunction with a variety of environments where video communication is useful, including for example, the home. The present inventive concepts may be utilized with conventional seating arrangements, are highly effective in use by increasing the overall effectiveness of a given office system by leveraging the space between on-site conference participants such as the space located between seated on-site conference participants including the open area between chairs or other seating arrangements. Various embodiments may more closely mimic in-person communication for all participants than current video-conferencing systems by the positioning of the remote user with respect to other participants. Other technical benefits associated with particular embodiments may include these or other advantages associated with video communication without the costs often associated with dedicated video-conferencing rooms.

The invention claimed is:

1. A method for video-teleconferencing, comprising:
providing a worksurface;
providing a plurality of seating units, each adapted to support a seated user thereon such that a head of the seated user is located at a first vertical height; and
providing at least one seating unit of the plurality of seating units having a back assembly with a display support adapted to support a display in a forwardly-facing orientation with respect to the seating unit so that the display is viewable from a position located in front of the seating unit, the display support further adapted to support the display at a second vertical height such that the display is entirely positioned above the worksurface and that is substantially the same as the first vertical height for use in video-conferencing applications while located on the seating unit.

2. The method of claim 1, further comprising:
establishing a connection with a remote participant;
displaying an image from the remote participant on the display;
positioning the display in the display support of the at least one seating unit;
sitting in at least one of the plurality of seating units; and
viewing the display from at least one of the plurality of seating units not including the display support.

3. The method of claim 2, further comprising:
establishing a connection with a remote participant;
displaying an image from the remote participant on the display;
positioning the display in the display support of the at least one seating unit;
sitting in at least one of the plurality of seating units; and
viewing the display from at least one of the plurality of seating units not including the display support while a user is positioned in the at least one of the plurality of seating units that includes the display support.

4. The method of claim 1, wherein the display support is movable between an in-use position, wherein the display is viewable from a location in front of a back of the at least one seating unit including the display support, and a storage position, wherein the display is at least partially obscured from view from the location in front of the back of the at least one seating unit including the display unit.

5. The method of claim 4, wherein display support is pivotably movable between the in-use position and the storage position.

6. The method of claim 5, wherein the first display is positioned at least partially behind the back when the display support is in the storage position.

7. The method of claim 1, wherein the display support is movable between an in-use position, wherein the display is located at the second vertical height, and a storage position, wherein the display is at least partially located below the second vertical height.

8. A method for video-teleconferencing, comprising:
providing a plurality of seating units, each adapted to support a seated user thereon such that a head of the seated user is located at a first vertical height; and
providing at least one seating unit of the plurality of seating units with a display support adapted to support a display in a forwardly-facing orientation with respect to the seating unit so that the display is viewable from a position located in front of the seating unit, the display support further adapted to support the display at a second vertical height that is substantially the same as the first vertical height for use in video-conferencing applications while located on the seating unit;
wherein the display support is releasably coupled to at least one of a base, a seat and a back of the at least one seating unit including the display support.

9. The method of claim 1, further comprising:
providing a headrest to the at least one chair including the display support adapted to support the head of a seated user, wherein the headrest assembly is coupled to the display support.

10. The method of claim 9, wherein the headrest is releasably coupled to the display support.

11. The method of claim 9, wherein the headrest is integrated into the display support.

12. The method of claim 1, further comprising:
providing a power source adapted to provide power to the first display.

13. The method of claim 12, wherein the display support further includes the power source.

14. The method of claim 1, wherein the display is one of a plurality of displays.

15. The method of claim 14, wherein the plurality of displays includes a pair of displays that are spaced substantially horizontally from one another.

16. The method of claim 1, wherein the display support supports the display at a position at least partially above and at least partially to a side of a back of the at least one seating unit including the display support.

17. The method of claim 1, further comprising:
a first camera adapted to detect an image from a first direction and a second camera adapted to detect an image from a second direction that is different than the first direction, and wherein the display support is configured to provide unobstructed detection for the first camera and the second camera when the display support is in an in-use position.

18. The method of claim 17, wherein the first direction and the second direction are substantially opposite one another.

19. The method of claim 1, wherein the display is located vertically above the seat support surface at a distance of between about 26 inches and about 34 inches.

20. The method of claim 19, wherein the display is located vertically above the seat support surface at a distance of between about 27 inches and about 33 inches.

21. The seating unit of claim 20, wherein the display is located vertically above the seat support surface at a distance of between about 29 inches and about 31 inches.

22. The method of claim 1, wherein the step of providing the at least one seating unit with a display support includes:

providing a flexible body portion that wraps about a back of the at least one seating unit supporting the display support such that a first portion of the flexible body portion is located forwardly of a front surface of the back and a second portion of the flexible body portion is located rearwardly of a rear surface of the back; and providing a support portion coupled to the body portion and that extends outwardly therefrom when the flexible body portion is wrapped about the back, wherein the support portion supports the display such that the display extends upwardly from the back.

23. A method for video-teleconferencing, comprising:

providing a plurality of seating units, each adapted to support a seated user thereon such that a head of the seated user is located at a first vertical height; and providing at least one seating unit of the plurality of seating units with a display support adapted to support a display in a forwardly-facing orientation with respect to the seating unit so that the display is viewable from a position located in front of the seating unit, the display support further adapted to support the display at a second vertical height that is substantially the same as the first vertical height for use in video-conferencing applications while located on the seating unit;

wherein the display is contained within a video-communication handheld device.

24. The method of claim 23, wherein the handheld device comprises a tablet.

25. The method of claim 1, wherein the worksurface comprises a table.

* * * * *